United States Patent
Sandberg

(10) Patent No.: US 9,055,492 B2
(45) Date of Patent: Jun. 9, 2015

(54) METHOD AND A NETWORK NODE FOR SHARING INFORMATION OVER AN INTERFACE IN A TELECOMMUNICATIONS SYSTEM

(75) Inventor: Pontus Sandberg, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 147 days.

(21) Appl. No.: 13/880,265

(22) PCT Filed: Nov. 30, 2010

(86) PCT No.: PCT/SE2010/051318
§ 371 (c)(1),
(2), (4) Date: Apr. 18, 2013

(87) PCT Pub. No.: WO2012/060757
PCT Pub. Date: May 10, 2012

(65) Prior Publication Data
US 2013/0208702 A1    Aug. 15, 2013

Related U.S. Application Data

(60) Provisional application No. 61/409,648, filed on Nov. 3, 2010.

(51) Int. Cl.
H04W 36/00      (2009.01)
H04W 24/02      (2009.01)
H04W 8/26       (2009.01)
H04W 88/08      (2009.01)
H04W 92/20      (2009.01)

(52) U.S. Cl.
CPC ............ *H04W 36/0077* (2013.01); *H04W 8/26* (2013.01); *H04W 24/02* (2013.01); *H04W 88/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 5,781,536 A * | 7/1998 | Ahmadi et al. | 370/252 |
| 2010/0008293 A1 | 1/2010 | Gupta et al. | |
| 2010/0227603 A1 | 9/2010 | Gupta et al. | |
| 2011/0038431 A1* | 2/2011 | Frederiksen et al. | 375/259 |
| 2012/0142355 A1* | 6/2012 | Jha | 455/436 |

FOREIGN PATENT DOCUMENTS

| | | |
|---|---|---|
| EP | 2 104 284 | 9/2009 |
| EP | 2 139 257 | 12/2009 |
| WO | WO 2009/120127 | 10/2009 |

OTHER PUBLICATIONS

International Search Report for PCT/SE2010/051318 mailed Aug. 25, 2011.

(Continued)

*Primary Examiner* — Kevin C Harper

(57) ABSTRACT

The exemplary embodiments of the presently claimed invention relate to a method and a radio base station (600) for identifying candidate or neighbor base stations. The radio base station (600) is configured to include in a first message an information element (IE) including the name of the radio base station (600) and to transmit this message, via the X2 interface, to a candidate or target radio base station. In response, the target base station includes its name in an IE of a response message and send it to the first (initiating) radio base station (600). The name sharing improves visualization and topology since the closest neighbor radio base station is easily identifiable when building radio base station's relations.

9 Claims, 9 Drawing Sheets

(56) References Cited

OTHER PUBLICATIONS

3GPP: "3rd Generation Partnership Project; Technical Specification Group Radio Access Network; Evolved Universal Terrestrial Radio Access Network (E-UTRAN); X2 application protocol (X2AP) (Release 10)", 3GPP TS 36.423 V10.0.0, Dec. 2010, 123 pages.

3GPP: "3rd Generation Partnership Project; Technical Specification Group Radio Access Network; Evolved Universal Terrestrial Radio Access Network (E-UTRAN); X2 application protocol (X2AP) (Release 9)", 3GPP TS 36.423 V9.0.0, Sep. 2009, 102 pages.

* cited by examiner

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This IE shall contain the complete list of cells served by the eNB | YES | reject |
| >Served Cell Information | M | | 9.2.8 | | - | - |
| >Neighbour Information | | 0 to maxnoofNeighbours | | | - | - |
| >>ECGI | M | | ECGI 9.2.14 | E-UTRAN Cell Global Identifier of the neighbour cell | - | - |
| >>PCI | M | | INTEGER (0..503, ...) | Physical Cell Identifier of the neighbour cell | - | - |
| >>EARFCN | M | | 9.2.26 | DL EARFCN for FDD and EARFCN for TDD | - | - |
| GU Group Id List | | 0 to maxfPools | | This is all the pools to which the eNB belongs to | GLOBAL | reject |
| >GU Group Id | M | | 9.2.20 | | - | - |

FIGURE 3A (Prior art structure of X2 SETUP REQUEST MESSAGE)

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| eNB name | O | | PrintableString (1..150,...) | | YES | ignore |
| Served Cells | | 1 to maxCellineNB | | This is all the eNB cells | YES | reject |
| >Served Cell Information | M | | 9.2.8 | | - | - |
| >Neighbour Information | | 0 to maxnoofNeighbours | | | - | - |
| >>ECGI | M | | ECGI 9.2.14 | E-UTRAN Cell Global Identifier of the neighbour cell | - | - |
| >>PCI | M | | INTEGER (0..503, ...) | Physical Cell Identifier of the neighbour cell | - | - |
| >>EARFCN | M | | 9.2.26 | DL EARFCN for FDD and EARFCN for TDD | - | - |
| GU Group Id List | | 0 to maxfPools | | This is all the pools to which the eNB belongs to | GLOBAL | reject |
| >GU Group Id | M | | 9.2.20 | | - | - |

FIGURE 3B (X2 SETUP REQUEST MESSAGE with new IE (eNB name))

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This IE shall contain the complete list of cells served by the eNB | YES | reject |
| >Served Cell Information | M | | 9.2.8 | | – | – |
| >Neighbour Information | | 0 to maxnoofNeighbours | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifier of the neighbour cell | – | – |
| >>EARFCN | M | | 9.2.26 | DL EARFCN for FDD and EARFCN for TDD | – | – |
| GU Group Id List | | 0 to maxPools | | This is all the pools to which the eNB belongs to | GLOBAL | reject |
| >GU Group Id | M | | 9.2.20 | | - | - |
| Criticality Diagnostics | O | | 9.2.7 | | YES | ignore |

FIGURE 4A (Prior art structure of X2 SETUP RESPONSE MESSAGE)

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| eNB name | O | | PrintableString (1..150,...) | | YES | ignore |
| Served Cells | | 1 to maxCellineNB | | This is all the eNB cells | YES | reject |
| >Served Cell Information | M | | 9.2.8 | | – | – |
| >Neighbour Information | | 0 to maxnoofNeighbours | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifier of the neighbour cell | – | – |
| >>EARFCN | M | | 9.2.26 | DL EARFCN for FDD and EARFCN for TDD | – | – |
| GU Group Id List | | 0 to maxPools | | This is all the pools to which the eNB belongs to | GLOBAL | reject |
| >GU Group Id | M | | 9.2.20 | | - | - |
| Criticality Diagnostics | O | | 9.2.7 | | YES | ignore |

FIGURE 4B (X2 SETUP RESPONSE MESSAGE with new IE (eNB name))

METHOD AND A NETWORK NODE FOR SHARING INFORMATION OVER AN INTERFACE IN A TELECOMMUNICATIONS SYSTEM

This application is the U.S. national phase of International Application No. PCT/SE2010/051318 filed 30 Nov. 2010 which designated the U.S. and claims priority to U.S. Provisional Application No. 61/409,648 filed 3 Nov. 2010, the entire contents of each of which are hereby incorporated by reference.

TECHNICAL FIELD

The present invention relates generally to the field of telecommunications, and, more particularly, to a method and a network node in terms of a radio base station for name configuration/sharing within a telecommunications system.

BACKGROUND

The 3rd Generation Partnership Project (3GPP) is responsible for the standardization of the UMTS (Universal Mobile Telecommunication Service) system, and LTE is currently under discussion as a next generation mobile communication system of the UMTS system. LTE is a technology for realizing high-speed packet-based communication that can reach high data rates both in the downlink and in the uplink. The 3GPP work on LTE is also referred to as Evolved Universal Terrestrial Access Network (E-UTRAN). Thus work is ongoing in 3GPP to specify an evolution to UTRAN, denoted E-UTRA, as part of the LTE effort. The first release of LTE, referred to as release-8 (Rel-8) can provide peak rates of 300 Mbps, a radio-network delay of e.g. 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in at least frequency division duplex (FDD) and time division duplex (TDD). Other operation modes can also be used. A radio base station in LTE is known as eNB or eNodeB, which may be viewed as a macro radio base station in LTE.

The subsequence release i.e. LTE release 9 aims to providing further functionalities to support efficiently so called home radio base stations operation and to also to provide a better user experience supporting LTE access technology. These home radio base stations are also known as Home eNBs, HeNBs. The coverage area of a HeNB is smaller than that of a eNB.

For the next generation mobile communications system e.g. IMT-advanced and/or LTE-advanced, which is an evolution of LTE, support for bandwidths of up to 100 MHz is being discussed. One issue with such large bandwidth is that it is challenging to find free 100 MHz of contiguous spectrum, due to that radio spectrum a limited resource. LTE-advanced may be viewed as a release-10 (Rel-10) of the LTE standard and since it is an evolution of LTE, backward compatibility is important so that LTE-advanced can be deployed in spectrum already occupied by LTE (e.g. Rel-8 and/or Rel-9). This means that for a LTE user equipment or a LTE terminal, a LTE-advanced capable network can appear as a LTE network.

The interface between neighbour eNBs is called the X2 interface and X2AP is the X2 application protocol used to convey the signaling between eNBs. Hence, radio network layer signaling procedures of the control plane between eNBs in E-UTRAN transmitted via the X2 interface and X2AP supports the functions of the X2 interface. X2AP is described in $3^{rd}$ generation partnership project, technical specification 3GPP TS 36.423 entitled: "*E-UTRAN, X2 application protocol (X2AP)*".

A plurality of functions may be provided by the X2AP protocol. Examples of functions are: Mobility Management allowing a eNB to move the responsibility of a certain user equipment (UE) to another eNB; Load management used by eNBs to indicate resource status, overload and traffic load to each other; Resetting of the X2 used to reset the X2 interface; Setting up the X2 used to exchange necessary data for the eNB for setup of the X2 interface and implicitly perform an X2 Reset; eNB Configuration Update allowing updating of application level data for two eNBs to interoperate correctly over the X2 interface; Mobility Parameters Management allowing a eNB to coordinate adaptation of mobility parameter settings with a peer eNB; Mobility Robustness Optimization allowing reporting of information related to mobility failure events; Energy Saving. This function allows decreasing energy consumption by enabling indication of cell activation/deactivation over the X2 interface; Mobility Management allowing a eNB to move the responsibility of a certain UE to another eNB, etc. It should be mentioned that a eNB controls at least one cell associated to a cell identifier called "global cell identifier", and that each eNB belongs to at least one tracking area identified by a code called "tracking area code" which is part of a tracking area identifier. A UE in a serving cell controlled by a serving eNB may move to a new cell controlled by the same eNB or to a new cell controlled by another eNB i.e. a target eNB. For this, a function called automatic neighboring relation (ANR) may be used. The UE reports neighboring cells based on cell measurement data. Based on these measurements, the serving eNB may initiate a new neighbor relation to the target eNB. The ANR function is used in the eNBs. Hence, the UE informs the serving eNB to which it is connected, that it has detected a new neighboring cell controlled by a neighboring eNB i.e. a target eNB. The neighboring eNB may then establish a X2 relation used for e.g. mobility procedures.

In order for two eNBs to interoperate correctly over the X2 interface, a X2 setup procedure may be used to exchange application level information data over the interface. As an example, an initiating eNB may send X2 SETUP REQUEST message to a candidate/target eNB. If possible, the candidate/target eNB replies with the X2 SETUP RESPONSE message. This will establish a relation between the two eNBs. The initiating eNB may transfer, in the SETUP REQUEST message, the complete list of its served cells and, if available, a list of supported Globally Unique (GU) Group Ids to the candidate eNB. The candidate eNB replies with the complete list of its served cells and shall include, if available, a list of supported GU Group Ids in the reply. The SETUP REQUEST message also includes the Global eNB identifier (ID) of the initiating eNB and the SETUP RESPONSE message includes the Global eNB ID of the candidate/target eNB. In general, Global eNB ID is used to globally identify an eNB.

The network topology is however considered too coarse when the global eNB identifiers are used by the eNBs to share information between them. The eNBs may be tracked using derived IP-addresses and neighboring eNB PLMN Id information. But this operation is quite complex in a network topology where there is a huge number of node's relations.

SUMMARY

It is an object of the exemplary embodiments of the present invention to address the above mentioned problems and to provide a method or a procedure that improves network visualization and topology in e.g. an LTE based network. This is achieved by introducing or adding a new information element (IE), for radio base station name, to the X2AP protocol i.e. by adding an IE which may hold eNB name. This enables (neighbor) eNBs to exchange name information between them when building neighbor relations thus improving visibility and network topology in addition to easily identifying neighbor cells/eNBs. Hence an automatic name sharing configuration is achieved.

According to an aspect of exemplary embodiments, the above stated problem is solved by means of a method in a radio base station (e.g. eNodeB or eNB) for identifying at least one neighboring/candidate eNBs/cell in a LTE based system. The method, in a first radio base station, comprising: introducing in a first message to be transmitted to a second radio base station, an information element (IE) comprising a name of the first radio base station; sending the first message including the introduced IE, to the second radio base station; the first message being sent over the X2 interface between the first and second radio base stations; receiving from the second radio base station a message responsive to the first message, the received message comprising an IE including the name of the second radio base station, said received message being transmitted by the second radio base station over the X2 interface.

According to an embodiment, the first radio base station is a source eNB and the second radio base station is a neighbor eNB or a candidate eNB.

According to an embodiment, the first radio base station is a candidate eNB and the second radio base station is a source eNB.

According to an embodiment, the first message is a X2 SETUP REQUEST message and the received message is a X2 SETUP RESPONSE message, and wherein the X2AP protocol is used for allowing signaling of the request and response messages.

According to another aspect of exemplary embodiments, the above stated problem is solved by means of a first radio base station (e.g. eNodeB or eNB) for identifying neighboring/candidate eNBs/cells in a LTE based system. The first radio base station comprises means e.g. a processing unit configured to introduce in a first message to be transmitted to a second radio base station, an information element (IE) comprising a name of the first radio base station. The first radio base station further comprising a transmitter configured to send the first message including the introduced IE, to the second radio base station; the first message being sent over the X2 interface between the first and second radio base stations. The first radio base station further comprises a receiver configured to receive from the second radio base station a message responsive to the first message, the received message comprising an IE including the name of the second radio base station, said received message being transmitted by the second radio base station over the X2 interface to the first radio base station.

According to an embodiment, the first radio base station is a source eNB and the second radio base station is a neighbor eNB or a candidate eNB.

According to an embodiment, the first radio base station is a candidate eNB and the second radio base station is a source eNB.

According to an embodiment, the first message is a X2 SETUP REQUEST message and the received message is a X2 SETUP RESPONSE message, and wherein the X2AP protocol is used for allowing signaling of the request and response messages.

An advantage with the present invention is to easily and automatically identify neighboring/candidate radio base stations system without the need to use global radio base station identifier.

Another advantage with the present invention is to improve network visualizations and topology since the closest neighboring cells/radio base stations is easily identifiable when building radio base station's relations. In other words, by sharing and reflecting the name of the radio base station over the X2 interface when building the neighbor relations, the problem of lack of visibility on neighbor lists is solved. This is beneficial for SON (Self Organized Networks) employing ANR function but also other SON features along the way.

Yet another advantage with the present invention is that by introducing eNB name sharing during X2 SETUP REQUEST and X2 SETUP RESPONSE it is possible to create an improved observability for the defined neighbor relations in the network.

Still other objects and features of the exemplary embodiments of the present invention will become apparent from the following detailed description in conjunction with the accompanying drawings, attention to be called to the fact, however, that the following drawings are illustrative only, and that various modifications and changes may be made in the specific embodiments illustrated. It should further be understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3A is the prior art structure of the X2 SETUP REQUEST message.

FIG. 3B is a structure of the X2 SETUP REQUEST message in according with exemplary embodiments of the present invention.

FIG. 4A is the prior art structure of the X2 SETUP RESPONSE message.

FIG. 4B is a structure of the X2 SETUP RESPONSE message in according with exemplary embodiments of the present invention.

DETAILED DESCRIPTION

In the following description, for purposes of explanation and not limitation, specific details are set forth such as particular architectures, scenarios, techniques, etc. in order to provide thorough understanding of the present invention. However, the difference exemplary embodiments of the present invention may be practiced in other embodiments that depart from these specific details.

The different exemplary embodiments are described herein by way of reference to particular example scenarios. In particular, the solution is described in a non-limiting general context in relation to establishing a relation between radio base stations by means of a X2 setup procedure to exchange application level information data over the X2 interface using the X2 application protocol (X2AP) in a LTE based system. It should be noted that the present invention is not restricted to LTE but may be applicable in other wireless systems wherein setup procedures in connection with sharing information over X2 interface may be performed.

Figure 1:
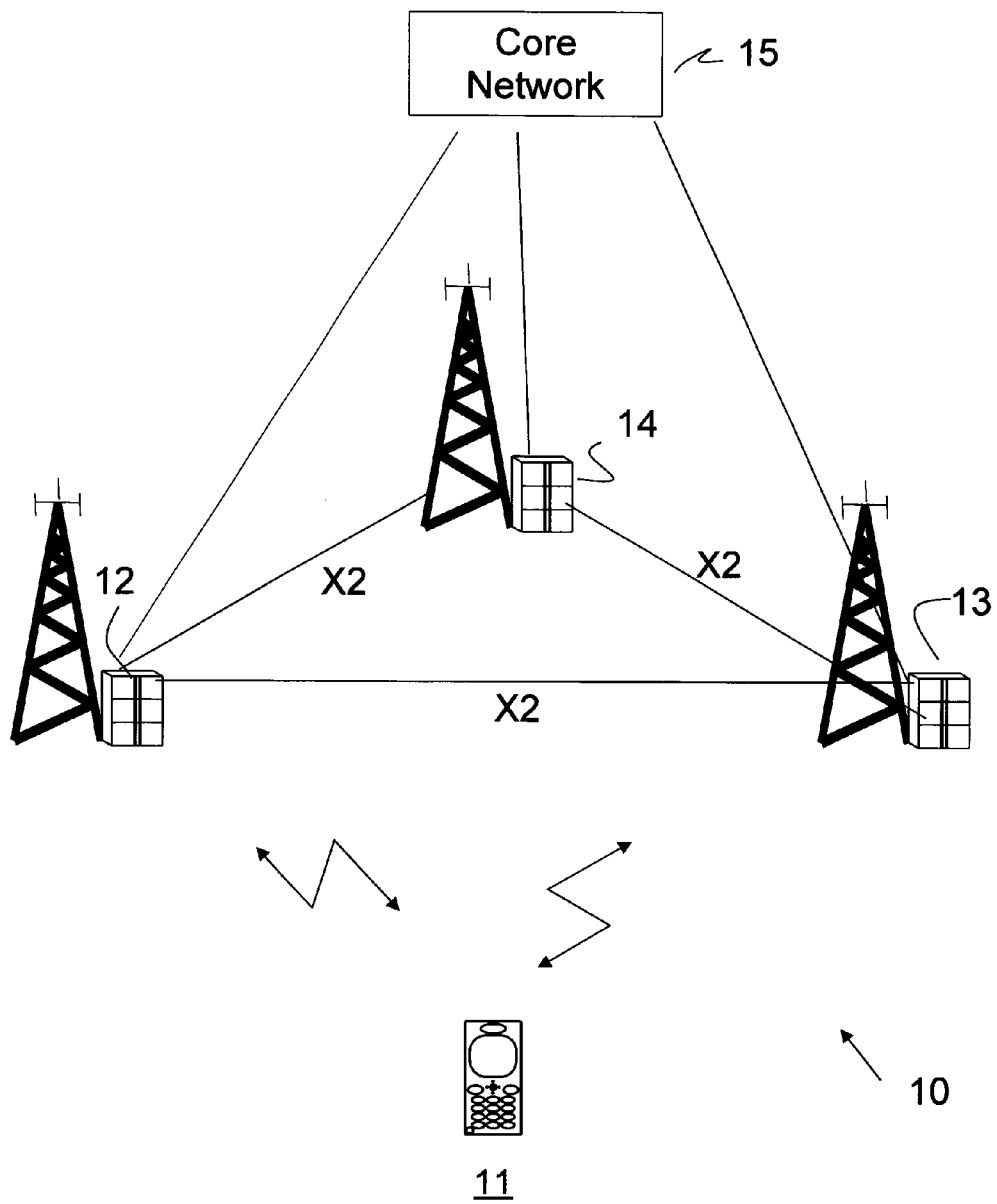
FIG. 1 is a simplified diagram illustrating an exemplary wireless telecommunications system wherein exemplary embodiments may be applied.

Referring to FIG. 1, there is illustrated a block diagram of an exemplary wireless telecommunications network system in which the different exemplary embodiment may be applied. Note that the system depicted in FIG. 1 only shows transceivers or nodes that are necessary for understanding the different exemplary embodiments of the present invention. As shown, the system, which may be represented by a LTE system or E-UTRAN (LTE Rel-8 and/or Rel-9 and/or Rel-10 or later), comprises a number of user equipments UE 11 (only one is shown), and apparatuses acting as radio base stations (eNBs) 12, 13 and 14. One of the functions of the eNBs is to control traffic to and from UEs in a cell (not shown). A UE is suitable to be used as a mobile phone, a wireless terminal, a laptop, a personal computer, a personal digital assistant, a voice over internet protocol (VoIP) capable phone or any other 3GPP LTE capable equipment. Traffic, over a radio link, from a eNB to a UE is referred to as downlink (DL) traffic and traffic, over a radio link, from the UE to a eNB is referred to as uplink (UL) traffic. Note that in FIG. 1 the number of UEs and eNBs is only illustrative and the embodiments of the present invention are not restricted to any particular number of UEs and/or number of eNBs. The figure also depicts a core network 15 e.g. a Evolved Packet Core (EPC) to which the eNBs 12, 13 are connected. The eNBs generally are connected to other network nodes of the core network 15 such as a mobility management entity (MME), one or more gateways etc. In FIG. 1, the interface between the eNBs is denoted X2.

Figure 2:
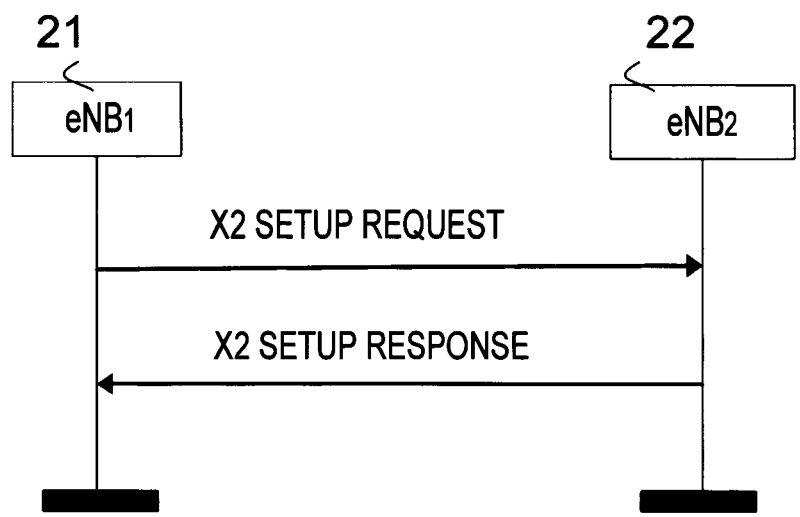
FIG. 2 is a simplified setup signaling procedure between a first radio base station and a a second radio base station.

Referring to FIG. 2, there is illustrated a setup signaling procedure between a first radio base station 21 denoted eNB1 and a second radio base station 22 denoted eNB2. This setup procedure applies when a eNB initiates or establishes a X2 relation used for e.g. mobility procedures such as a handover of a UE from a source eNB to a target cell served by a target eNB. Hence, in order for eNB1 and eNB2 to operate correctly over the X2 interface, a X2 SETUP REQUEST message is sent from initiating eNB1 to target/candidate/neighbor eNB2. In response to that message, eNB2 responds by sending a X2 SETUP RESPONSE message. This will establish a relation between the two eNBs. Note that that the roles of the eNBs may be exchanged i.e. eNB2 may be the initiating eNB and eNB1 the target/candidate/neighbor eNB.

The initiating eNB1 is configured to transfer in the X2 SETUP REQUEST message a plurality of information or information elements (IE) including at least a list of served cells, the Global eNB ID used to globally identify eNB1 and, if possible, a GU Group Id List. The structure of prior art X2 SETUP REQUEST message is depicted in FIG. 3A as defined in 3GPP TS 36.423 entitled: "*E-UTRAN, X2 application protocol (X2AP)*". The first column defines the IE/Group name and includes, as shown, Global eNB ID, Served cells, neighbour information etc. The second column identifies if an information is mandatory (M) or optional (O). As an example the Global eNB ID is M i.e. mandatory. The third column defines the Range. For example, the maximum number of cells served by a eNB, in this case eNB1, is denoted maxCellineNB. The fourth column indicates where in the specifications 3GPP TS 36.423 the IE type and reference may be found. As an example, Global eNB ID is defined in subclause 9.2.13 of the specifications. The fifth column describes the Semantics of a corresponding IE. As an example, the IE Served cells shall contain the complete list of cells served by the eNB. The sixth and seventh columns are denoted Criticality and Assigned Criticality. More information on the content of the message and explanations on the data of the message shown in FIG. 3A can be found in the cited 3GPP TS 36.423.

As depicted in FIG. 3A, in the current prior art X2 SETUP REQUEST message, there is no reference to the serving/initiating eNB name only the Global eNB ID. The global ID is used to globally identify the eNB but cannot be used to create X2 relations in the initiating and candidate to point out reference to the eNBs with regard to their name name. They can only be tracked using IP addresses and neighboring eNB PLMN ID information, which is quite time consuming when dealing with a huge number of node's and relations. With the current defined IEs it is not possible to create names for the relations in e.g. the Managed Information Base (MIB) as it does not reflect source and target X2 eNB neighbor relations.

FIG. 3B depicts a modified X2 SETUP REQUEST message in accordance with exemplary embodiments. As shown a new row is introduced comprising a new IE which holds a name of the initiating eNB denoted in FIG. 3B eNB name, although any suitable name can be used. Data information in each cell of the new row is underlined to distinguish from the message of FIG. 3A. In the example of FIG. 3B, the presence of the eNB name is stated O (column 2). This of course can be changed to M if applicable in the standardization. The new IE type (column 3) is denoted PrintableString (1 . . . 150 . . . ) meaning that any suitable string can be used to define the IE type. The criticality is set to YES (column 5) although other information can be used. The information in the last column (col. 6) is set to ignore although other information may also be used. The remaining cells of the new row are not necessarily empty. The new X2 SETUP REQUEST message is transmitted by eNB1 to eNB2 and may be used to transfer initialization information for e.g. Transport Network Load (TNL) association. In addition, eNB2, upon receiving this information, has direct knowledge of the name of the neighbor eNB1 in an automatic fashion.

As previously described in conjunction with FIG. 2, eNB2 replies in response to the X2 SETUP REQUEST message with a X2 SETUP RESPONSE message. As depicted in FIG. 4A, in the current prior art X2 SETUP RESPONSE message, there is no reference to the target/candidate eNB2 name.

FIG. 4A depicts a modified X2 SETUP RESPONSE message in accordance with the present embodiments. As shown a new row is introduced comprising a new IE which holds a name of the target/candidate eNB denoted in FIG. 4B eNB name, although any suitable name may be used. Data information in each cell of the new row is underlined to distinguish from the message of FIG. 4A. In the example of FIG. 4B, the presence of the eNB name is stated O (column 2). This of course can be changed to M if applicable in the standardization. The new IE type (column 3) is denoted PrintableString (1 . . . 150 . . . ) meaning that any suitable string can be used to define the IE type. The criticality is set to YES (column 5) although other information can be used. The information in the last column (col. 6) is set to ignore although other information may also be used. The remaining cells of the new row are not necessarily empty. The new X2 SETUP RESPONSE message is transmitted by eNB2 to eNB1 and may be used to transfer e.g. TNL association. In addition, eNB1, upon receiving this information from eNB2, has automatic and direct knowledge of the name of the neighbor eNB2.

Hence, according to embodiments of the present invention, in both X2 SETUP REQUEST and X2 SETUP RESPONSE messages a new IE for eNB name is added to the transferred element (in both directions) in the protocol signaling. On both sides of the relation, the name of the correspondent eNB may then be used when creating neighbor objects in the MIB. This will finalize a name exchange from both eNBs. The trouble of identifying neighboring cells/eNBs may therefore be solved by the introduction of the eNB name in the messages described above. This leads to that the network visualization and topology is improved since the closest neighboring cells/eNBs are easily identifiable through the message exchange. In other words, by sharing and reflecting the name of the eNB over the X2 interface the problem of lack of visibility on neighbor lists is solved. This is beneficial over manual configuration of eNB relation.

As an example, in case X2 neighbor relations is/are created manually, these relations are created in the source eNB, for example, by the network operator according to their names and also showing the relation topology. As an example:

. . . ,extENodeBRelation=1,eNB1_to_eNB2
  . . . ,extENodeBRelation=1,eNB1_to_eNB3

However, as the relation may be bi-directional, the corresponding extEnbRelations should be created in the target eNB. As the X2 SETUP REQUEST does not send IE:s on target eNB name, the same naming convention is not to be used in target eNB. Hence when relations are created manually in source, a plug and play functionality is provided, so when the target eNB receives the X2 SETUP REQUEST, the target eNB may create its own configurables (MO:s) based on the source eNB. Thus, the introduction of eNB names in the SETUP REQUEST and SETUP RESPONSE messages and the sending of this information via X2 interface between the involved eNBs improve understanding and observability when listing eNB neighbor relations in e.g. a self-organizing network (SON). It should be mentioned that the eNBs according to exemplary embodiments are configured to implement and use the ANR function.

Figure 5:
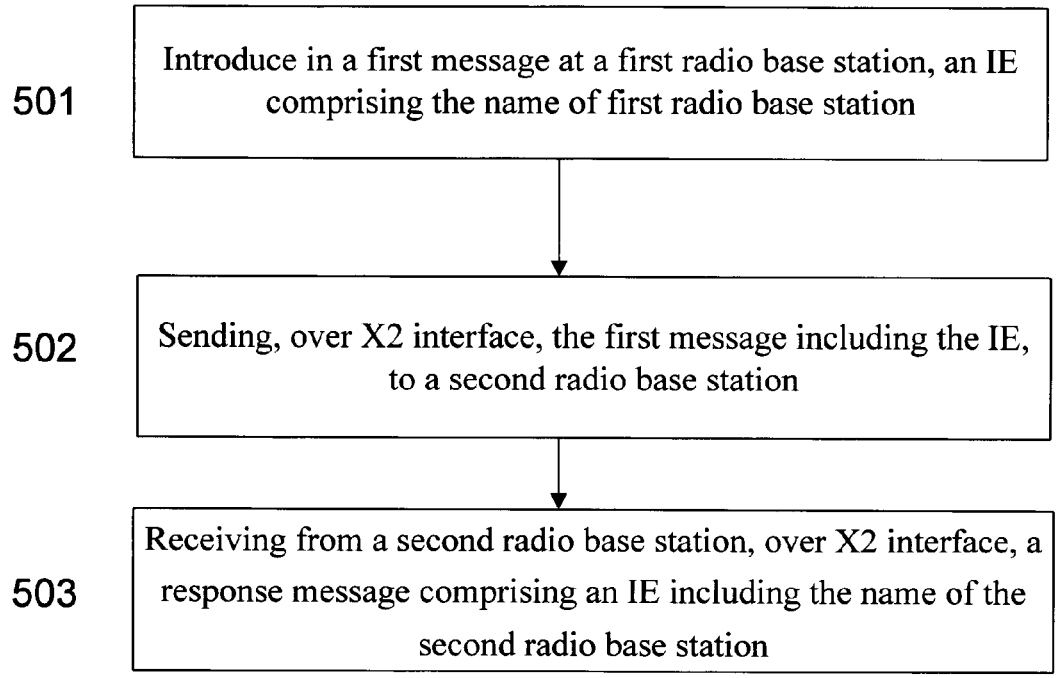
FIG. 5 is a diagram illustrating a flowchart of a method performed, in a radio base station (eNB), according to exemplary embodiments of the present invention.

Referring to FIG. 5 there is described a flowchart of a method for identifying neighbor/candidate radio base stations to be performed/implemented in radio base station e.g. a eNB or a eNodeB capable in operating in a LTE based system. As shown, the main steps comprise:

(501) introducing or including in a first message (e.g. X2 SETUP REQUEST message), an IE comprising a name of the first radio base station;

(502) transmitting, over the X2 interface, the first message to a second radio base station (i.e. to neighbor/candidate/target radio base station); and (503) receiving from the second radio base station, over X2, a response message (e.g. X2 SETUP RESPONSE message) comprising an IE including name of the second radio base station.

Details on what information may be included in the exchange message have been previously described and are therefore not unnecessarily repeated again. Note however that in case the SETUP RESPONSE message does not comprise a IE including the eNB name i.e. the response message is in accordance with prior art response message, then the source eNB may use e.g. the Global eNB ID of the target eNB to identify the target eNB.

As previously described, plurality of functions may be provided by the X2AP protocol. Examples of functions are: Mobility Management allowing a eNB to move the responsibility of a certain UE to another eNB; Load management used by eNBs to indicate resource status, overload and traffic load to each other; Resetting of the X2 used to reset the X2 interface; Setting up the X2 used to exchange necessary data for the eNB for setup of the X2 interface and implicitly perform an X2 Reset; eNB Configuration Update allowing updating of application level data for two eNBs to interoperate correctly over the X2 interface etc. Hence, the first message and the second message are not restricted to a X2 setup request message and a X2 setup response message respectively. In other words, the first (or initiating) eNB may include the new IE comprising the name of the first eNB in a eNB configuration Update message and send it to another e.g. a candidate or neighbor eNB for allowing updating of application level data so that to interoperate correctly over the X2 interface. The second eNB upon receiving this message may reply with a message to inform the first eNB that the update of application data was performed successfully. In the event that update is unsuccessful the second eNB may indicate failure to update in a response message.

Figure 6:
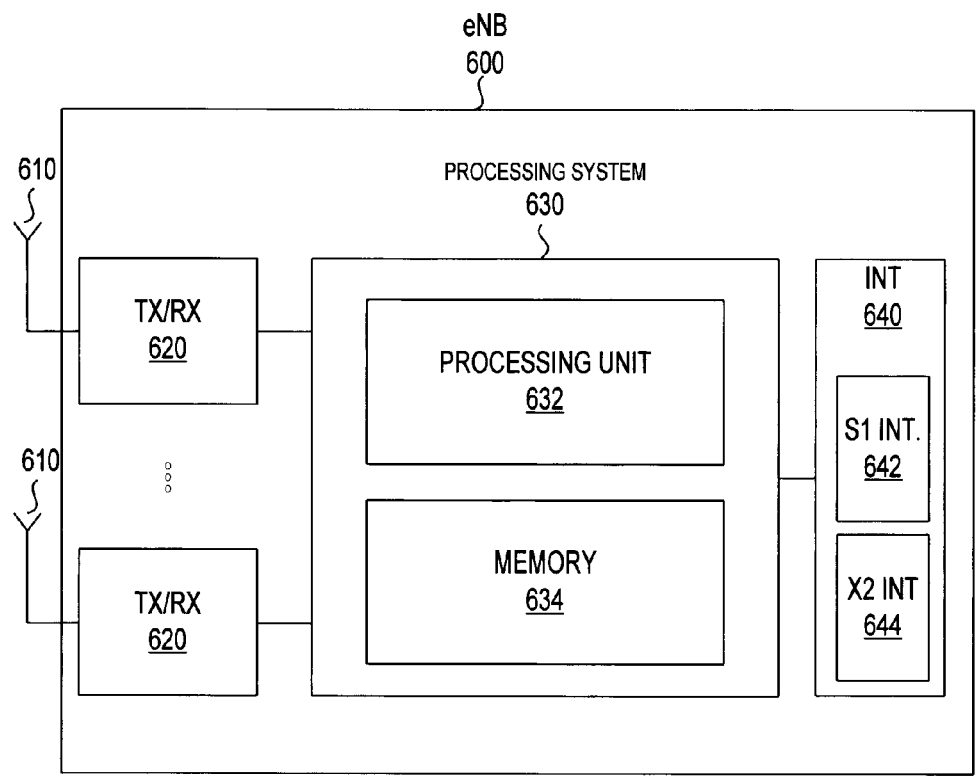
FIG. 6 illustrates a block diagram of an exemplary radio base station (eNB) according to embodiments of the present invention.

Referring to FIG. 6 there is illustrated a block diagram of an exemplary radio base station 600 (e.g. eNB or eNodeB). Exemplary components of eNB 600 are shown. As illustrated, eNB 600 may include antennas 610, transceivers 620, a processing system 630, and an interface 640. Antennas 610 may include one or more directional and/or omni-directional antennas. Transceivers 620 may be associated with antennas 610 and include transceiver circuitry for transmitting and/or receiving symbol sequences in a network via antennas 610. Processing system 630 may control the operation of eNB 600. Processing system 630 may also process information received via transceivers 620 and interface 640. As illustrated, processing system 630 include a processing logic/unit 632 and a memory 634. It will be appreciated that processing system 630 may include additional and/or different components than illustrated in FIG. 6. Processing logic/unit 632 may include a processor, microprocessor, an ASIC, FPGA, or the like. Processing logic/unit 632 may process information received via transceivers 620 and interface 640. According to an embodiment, the processing logic/unit 632 is configured to assemble a first message and to introduce in the first message e.g. X2 SETUP REQUEST message an IE including the name of the eNB 600. The eNB transceiver 620 (e.g. one or more transmitters/receivers or transceivers TX/RX in combination with antenna(s)) is configured to transmit/send the first message to a second radio base station i.e. to a neighbor/candidate/target eNB. The transmission being conducted over the X2 interface 644 between eNB 600 and the neighbor/candidate/target eNB. eNB 600 is further configured to receive from the neighbor/candidate/target eNB a message responsive to the first message e.g. X2 SETUP RESPONSE message. The received message comprises an IE including the name of the neighbor/candidate/target eNB. This message is received over the X2 interface. When the exchange of the message has been successfully completed name exchange from both eNBs is finalized. eNB 600 may include the new IE comprising its name in a eNB configuration Update message and send it to second e.g. a candidate or neighbor eNB for allowing updating of application level data so that to interoperate correctly over the X2 interface. The second eNB upon receiving this message may reply with a message to inform the first eNB 600 that the update of application data was performed successfully. In the event that update is unsuccessful the second eNB may indicate failure to update in a response message.

It should be noted that interface 640 may include one or more line cards that allow eNB 600 to transmit data to and receive data from other devices over wired and/or wireless connections. As illustrated, interface 640 also includes an S1 interface 642 that allows eNB 600 to communicate, for example, with a MME/GW (mobility management entity/gateway). The X2 interface 644 is instead used to communicate with another eNB. eNB 600 may perform certain operations in response to processing logic/unit 632 executing software instructions contained in a computer-readable medium, such as memory 634. A computer-readable medium may be defined as one or more physical and/or logical memory devices. The software instructions may be read into memory 634 from another computer-readable medium or from another device via interface 640. The software instructions contained in memory 634 may cause processing logic 632 to perform processes/procedures described herein. Alternatively, hardwired circuitry may be used in place of or in combination with software instructions to implement processes/function/method described herein. Thus, embodiments described herein are not limited to any specific combination of hardware circuitry and software.

Although FIG. 6 shows exemplary components of eNB 600, in other implementations, eNB 600 may contain fewer, different, or additional components than depicted. In still other implementations, one or more components of eNB 600 may perform the tasks described as being performed by one or more other components of eNB 600.

Figure 7:
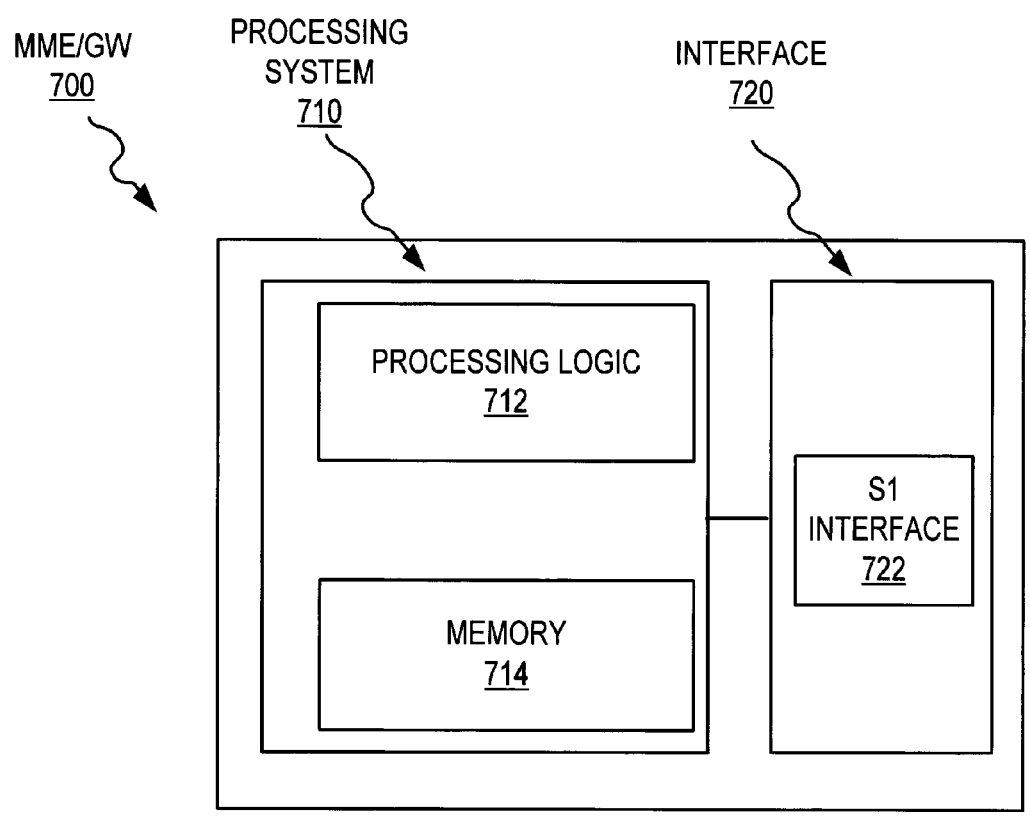
FIG. 7 illustrates a block diagram of an exemplary MME/GW.

As mentioned earlier, the eNB 600 generally also communicates with a MME/GW. FIG. 7 is a diagram of exemplary components of MME/GW 700 capable in communicating with e.g. eNB 600 of FIG. 6. As illustrated, MME/GW 700 may include a processing system 710 and an interface 720. Processing system 710 may control the operation of MME/GW 700. Processing system 710 may also process information received via interface 720. As illustrated, processing system 710 may include processing logic 712 and a memory 714. It will be appreciated that processing system 710 may include additional and/or different components than illustrated in FIG. 7.

Processing logic 712 may include a processor, microprocessor, an ASIC, FPGA, or the like. Processing logic 712 may process information received via interface 720. In addition, processing logic 712 may generate control messages and/or data messages and cause those control messages and/or data messages to be transmitted via interface 720. Processing logic 712 may also process control messages and/or data messages received from interface 720. Memory 714 may include a RAM, a ROM, and/or another type of memory to store data and instructions that may be used by processing logic 712.

Interface 720 may include one or more line cards that allow MME/GW 700 to transmit data to and receive data from other devices over wired and/or wireless connections. As illustrated, interface 720 may include an S1 interface 722 that allows MME/GW 700 to communicate, for example, with eNB 600. It will be appreciated that interface 720 may include additional interfaces than illustrated in FIG. 77. For example, interface 720 may include an interface for communicating with another network, such as a PDN (packet data network).

MME/GW 700 may perform certain operations in response to processing logic 712 executing software instructions contained in a computer-readable medium, such as memory 714. The software instructions may be read into memory 714 from another computer-readable medium or from another device via interface 720. The software instructions contained in memory 714 may cause processing logic 712 to perform processes described herein. Alternatively, hardwired circuitry may be used in place of or in combination with software instructions to implement processes described herein. It should be noted that the exemplary embodiments described herein are not limited to any specific combination of hardware circuitry and software.

The present invention and its embodiments may be realized in many ways. For example, one embodiment includes a computer-readable medium having instructions stored thereon that are executable by a radio base station (e.g. eNodeB or eNB) and/or a UE of a telecommunications system. The instructions executable by the radio base station and/or the UE and stored on a computer-readable medium perform the method steps of the present invention as previously described.

The invention claimed is:

1. A method in a first radio base station for identifying a second radio base station in a telecommunications system, the method comprising:

including in a first message an information element, IE, comprising a name identifying the first radio base station, wherein the name is associated with an assigned criticality that is different from an assigned criticality associated with a global identifier of the first base station;

transmitting, over an X2 interface between the first radio base station and the second radio base station, the first message including the IE, to the second radio base station; and receiving from the second radio base station, over the X2 interface, a response message comprising an IE including a name of the second radio base station.

2. The method according claim 1 wherein the first message is a X2 SETUP REQUEST message and the second message is a X2 SETUP RESPONSE message, and wherein a X2 application protocol, X2AP, is used for allowing signaling of the first message and of the second message.

3. The method according to claim 1 wherein the first message is further used to transfer initialization information for a transport network load association, TNL.

4. The method according to claim 1 wherein the second message is further used to transfer initialization information for a transport network load association, TNL.

5. The method according to claim 1 wherein the first radio base station is a source eNB and the second radio base station is a neighbor or candidate eNB.

6. The method according to claim 1 wherein the first radio base station is a candidate eNB and the second radio base station is a source eNB.

7. A radio base station for identifying a candidate or neighbor radio base station in a telecommunications system, comprising:

a processing unit configured to include in a first message an information element, IE, comprising a name identifying the radio base station, wherein the name is associated with an assigned criticality that is different from an assigned criticality associated with a global identifier of the first base station;

a transceiver configured to transmit, over an X2 interface between the radio base station and the candidate or neighbor radio base station, the first message including the IE, to the candidate or neighbor radio base station; and the radio base station is further configure to receive from the candidate or neighbor radio base station, over the X2 interface, a response message comprising an IE including a name of the candidate or neighbor radio base station.

8. The radio base station according to claim 7 wherein the first message is a X2 SETUP REQUEST message and the second message is a X2 SETUP RESPONSE message, and wherein a X2 application protocol, X2AP, is used for allowing signaling of the first message and of the second message.

9. The radio base station according to claim 7 is a eNB and the neighbor or candidate radio base station is a eNB.

* * * * *

UNITED STATES PATENT AND TRADEMARK OFFICE
CERTIFICATE OF CORRECTION

Page 1 of 1

PATENT NO. : 9,055,492 B2
APPLICATION NO. : 13/880265
DATED : June 9, 2015
INVENTOR(S) : Sandberg It is certified that error appears in the above-identified patent and that said Letters Patent is hereby corrected as shown below:

In the specification

In Column 4, Line 37, delete "and a a" and insert -- and a --, therefor.

In Column 6, Line 14, delete "their name name." and insert -- their name. --, therefor.

In the claims

In Column 10, Line 29, in Claim 2, delete "according claim" and insert -- according to claim --, therefor.

Signed and Sealed this
Fifth Day of January, 2016

Michelle K. Lee
*Director of the United States Patent and Trademark Office*